United States Patent

Usui et al.

[11] Patent Number: 5,818,827
[45] Date of Patent: Oct. 6, 1998

[54] RADIO COMMUNICATION DEVICE AND RADIO COMMUNICATION METHOD

[75] Inventors: Takashi Usui, Tokyo; Mitsuhiro Suzuki, Chiba, both of Japan

[73] Assignee: Sony Corporation, Tokyo, Japan

[21] Appl. No.: 693,442

[22] Filed: Aug. 7, 1996

[30] Foreign Application Priority Data

Aug. 9, 1995 [JP] Japan .................................. 7-203435

[51] Int. Cl.[6] .................................................. H04B 7/208
[52] U.S. Cl. ......................... 370/344; 370/342; 370/347
[58] Field of Search ..................................... 370/329, 335, 370/336, 337, 341, 342, 343, 344, 345, 441, 442, 347; 455/422, 450–453

[56] References Cited

U.S. PATENT DOCUMENTS 5,274,665  12/1993  Schiling ................................... 375/200
5,299,228   3/1994  Hall ......................................... 375/200
5,703,874  12/1997  Schilling ................................. 370/335

Primary Examiner—Ajit Patel
Attorney, Agent, or Firm—Jay H. Maioli

[57] ABSTRACT

A radio communication device has a first transmission and reception circuit for transmitting and receiving a channel which is established in a first occupied frequency band according to a first access process, and a second transmission and reception circuit for transmitting and receiving a channel which is established in a second occupied frequency band which is established in a guard band in the first occupied frequency band according to a second access process.

11 Claims, 6 Drawing Sheets

RADIO COMMUNICATION DEVICE AND RADIO COMMUNICATION METHOD

BACKGROUND OF THE INVENTION

1. Field of the Invention

The present invention relates to a radio communication device and a radio communication method which are suitable for application to a radio telephone unit such as a portable telephone set or the like.

2. Description of the Related Art

Various radio communication devices have been developed for transmitting audio data to and receiving audio data from a base station through radio communications to talk to a party which is connected to the base station. For example, there has been already in use a cellular radio communication system in which base stations are positioned uniformly at given distances of few kilometers, making up service areas, respectively. Radio telephone units for use in such a cellular radio communication system are referred to as portable telephone sets.

Some telephone sets which find use in relatively small areas such as home also carry out radio communications between a home base station and a handset unit in a cordless telephone device. The cordless telephone device has a small transmission output setting such that communications can be effected between the home base station and the handset unit to allow the user to talk through the handset unit within a radius of 100 meters from the installed position of the home base station.

The portable telephone sets and the handset units of the cordless telephone devices serve as functionally identical communication terminals. It has been attempted, therefore, to use a single communication terminal as both a portable telephone set and a handset unit of a cordless telephone device.

However, the frequency band assigned to radio telephone systems such as a cellular radio communication system is different than the frequency band assigned to cordless telephone devices. If a single communication terminal is to handle communications in both frequency bands, then since the single communication terminal needs to have a very wide frequency band for transmitting and receiving desired data, it is required to have a high-frequency circuit capable of handling such a very wide frequency band, and hence is complex in circuit arrangement.

For example, there has been developed a system, such as a personal handy phone system (PHS) currently available for use in Japan, in which channels for outdoor and indoor use are set to the same frequency band and a common communication system is employed for outdoor and indoor use. In such a system, a channel used indoors for a cordless telephone device cannot be used outdoors for a portable telephone set. Therefore, the number of channels that can be used outdoors for portable telephone sets is reduced, and hence not all channels that are assigned for use are effectively utilized.

SUMMARY OF THE INVENTION

It is therefore an object of the present invention to provide a radio communication device and a radio communication method which, when applied to a plurality of communication systems, such as a radio telephone system, e.g., a cellular radio communication system, and a cordless telephone system, allow terminals to be simplified in arrangement and also allow a frequency band to be effectively utilized.

According to the present invention, there is provided a radio communication device comprising a first transmission and reception circuit for transmitting and receiving a channel which is established in a first occupied frequency band according to a first access process, and a second transmission and reception circuit for transmitting and receiving a channel which is established in a second occupied frequency band which is established in a guard band in said first occupied frequency band according to a second access process.

Since the second occupied frequency band is contained in the first occupied frequency band, data can be transmitted and received by both the first and second transmission and reception circuits within the first occupied frequency band. Therefore, the radio communication device can have shared high-frequency circuits which make the over-all circuit arrangement relatively simple. Because the second occupied frequency band is established in a guard band in the first occupied frequency, a band area which would not be otherwise used in the first frequency band is effectively utilized.

According to the present invention, there is also provided a radio communication method comprising the steps of establishing a first radio communication process to establish a transmission channel in a first occupied frequency band according to a first access process, and establishing a second radio communication process to establish a transmission channel in a second occupied frequency band which is established in a guard band in said first occupied frequency band according to a second access process.

Inasmuch as the second occupied frequency band is contained in the first occupied frequency band, it is possible to establish channels according to both the first and second access processes within the first occupied frequency band. Therefore, the first frequency band can be effectively utilized.

DETAILED DESCRIPTION OF THE PREFERRED EMBODIMENT

Figure 1A:
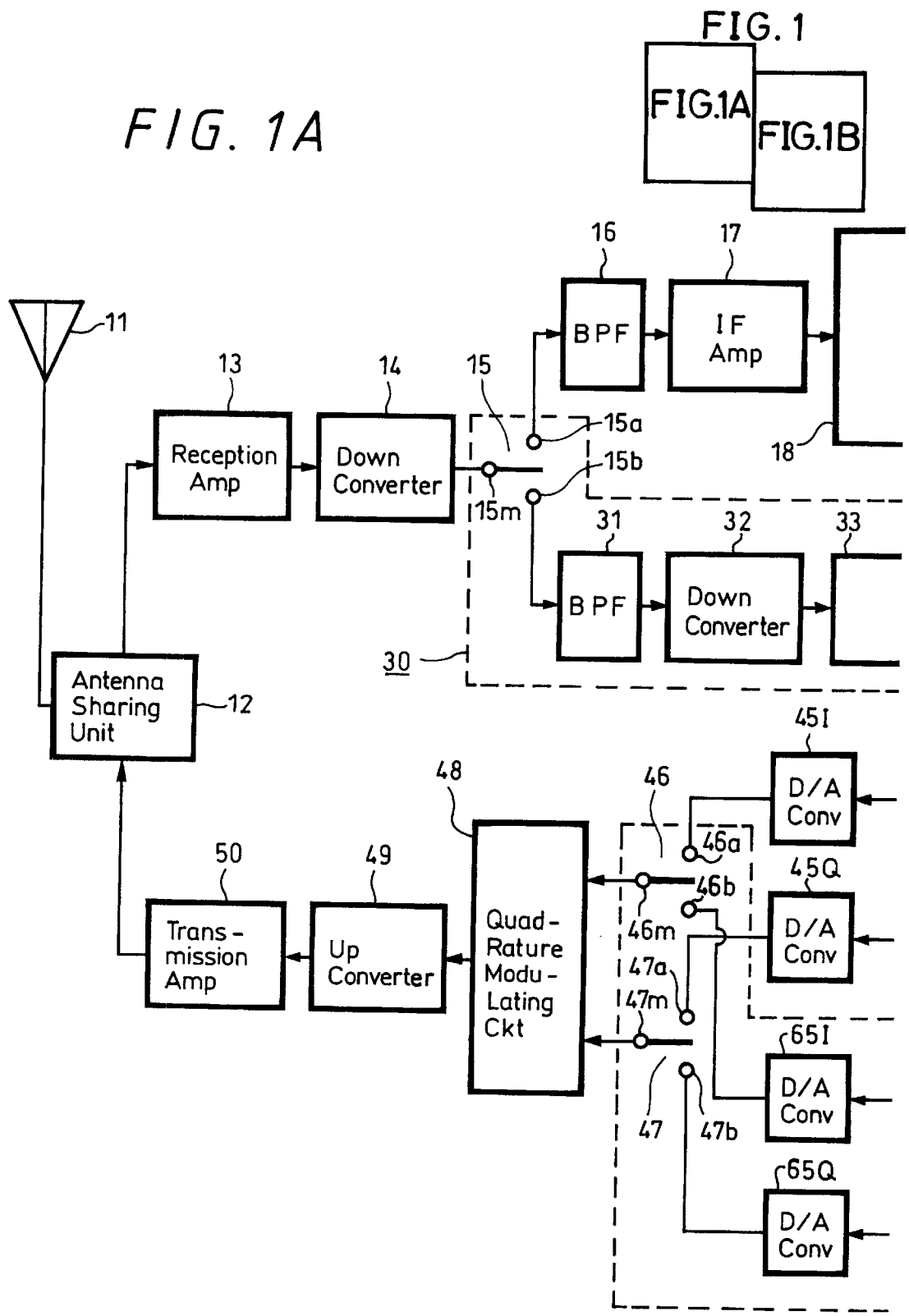
FIGS. 1A and 1B are a block diagram of a terminal as a radio communication device according to the present invention.
Figure 1B:
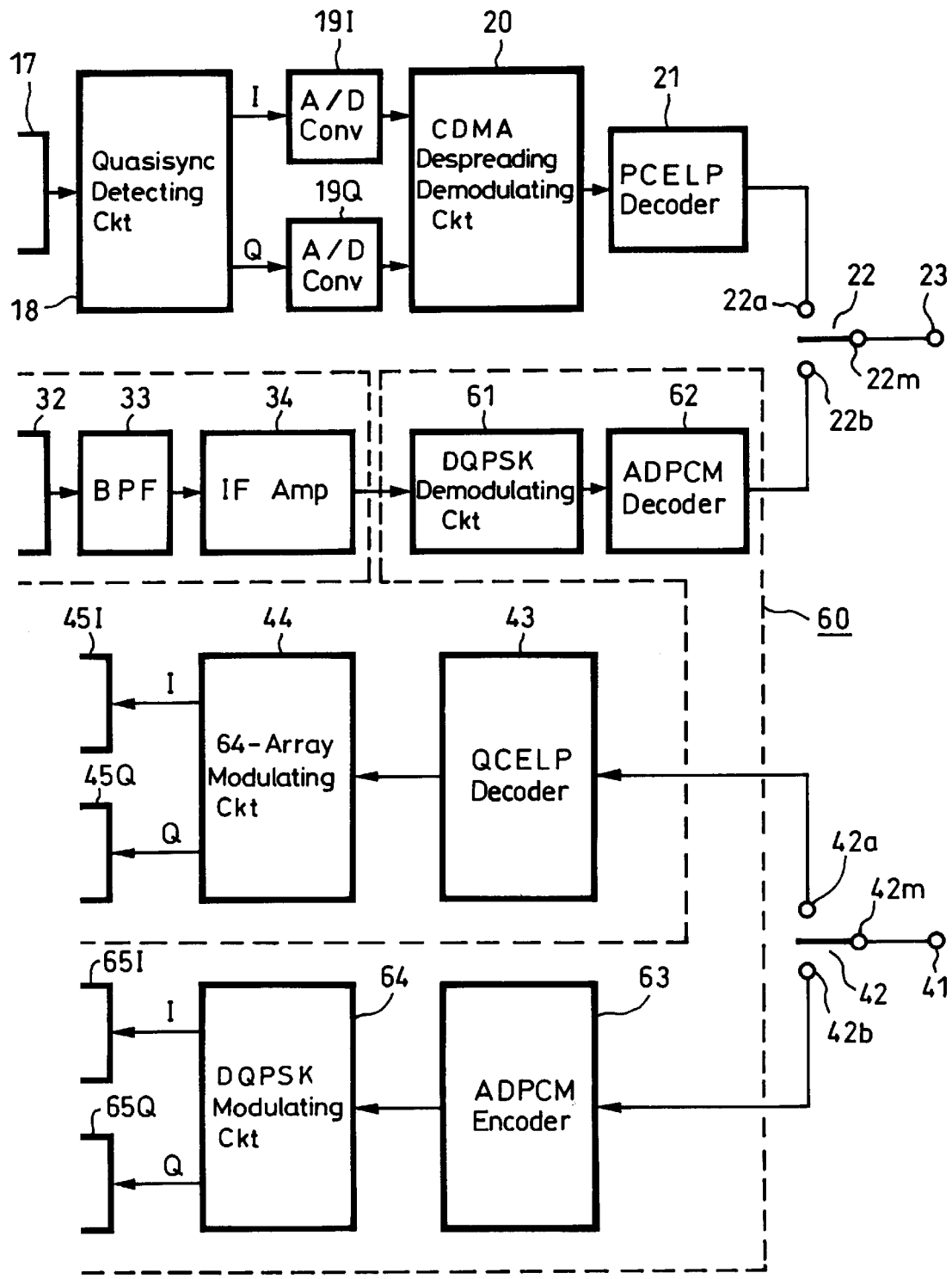

According to the present invention, a radio communication device according to the present invention is used as both a terminal of a digital cellular radio communication system which transmits digital data to and receive digital data from a base station through radio channels, and a handset set of a cordless telephone system which transmits data to and receives data from a home base station (HBS) installed at home. In the illustrated embodiment of the present invention, the digital cellular radio communication system comprises a radio communication system of the type in which channels are established according to CDMA (Code Division Multiplex Access), and the cordless telephone system comprises a cordless telephone system of the type in which channels are established according to FDMA (Frequency Division Multiplex Access). The terminal of the digital cellular radio communication system, which doubles as the handset set of the cordless telephone system, is shown in FIGS. 1A and 1B.

A reception system of the terminal will first be described below. A signal received by an antenna 11 is supplied through an antenna sharing unit 12 to a reception amplifier 13 called a low-noise amplifier. The received signal which is amplified by the reception amplifier 13 is supplied to a down converter 14 which converts the signal in a given transmission channel into a first intermediate frequency signal. A frequency band which is received and processed by the down converter 14 will be described later on. The first intermediate frequency signal is then supplied to a movable contact 15m of a selector switch 15 which serves to switch between a reception system of the digital cellular radio communication system and a reception system of the cordless telephone system.

The selector switch 15 has a first fixed switch 15a connected to the reception system of the digital cellular radio communication system. Specifically, the signal supplied to the first fixed switch 15a is supplied through a bandpass filter 16 and an intermediate frequency amplifier 17 to a quasi-synchronization detecting circuit 18 by which the signal transmitted according to CDMA is quasisynchronized and detected to produce an I-component detected signal and a Q-component detected signal. The I-component detected signal and the Q-component detected signal are supplied respectively to analog-to-digital converters 19I, 19Q which sample the supplied signals to generate digital data. The digital data generated by the analog-to-digital converters 19I, 19Q are supplied to a CDMA despreading demodulating circuit 20 that multiplies the supplied digital data by a predetermined despreading PN code thereby to despread the digital data into original data. The despread data is then supplied to a QCELP (Qualcomm Code Excited Linear Predictive coding) decoder 21. The QCELP decoder 21 decodes audio data modulated according to QCELP into an analog audio signal, and supplies the analog audio signal to a first fixed contact 22a of a selector switch 22.

The selector switch 15 has a second fixed contact 15b connected to the reception system of the cordless telephone system. Specifically, the signal supplied to the second fixed switch 15b is supplied to an intermediate frequency circuit 30 for the cordless telephone system. In the intermediate frequency circuit 30, the signal is supplied through a bandpass filter 31 to a down converter 32 which converts the first intermediate frequency signal into a second intermediate frequency signal. The second intermediate frequency signal is supplied through a bandpass filter 33 to an intermediate frequency amplifier 34. An amplified output signal from the intermediate frequency amplifier 34 is supplied to a DQPSK (Differential Quadrature Phase Shift Keying) demodulating circuit 61 in a baseband circuit 60 for the cordless telephone system. The DQPSK demodulating circuit 61 demodulates the supplied signal into demodulated data which are supplied to an ADPCM (Adaptive Differential Pulse Code Modulation) decoder 62. The ADPCM decoder 62 decodes the audio data which have been digitized according to ADPCM into analog audio signal which is then supplied to a second fixed contact 22b of the selector switch 22. The intermediate frequency circuit 30 includes the selector switch 15, the bandpass filter 31, the down converter 32, the bandpass filter 33, and the intermediate frequency amplifier 34.

The selector switch 22 has a movable contact 22m which supplies the analog audio signal transmitted from either the fixed contact 22a or the fixed contact 22b to an audio signal output terminal 23. The audio signal from the audio signal output terminal 23 is then amplified and otherwise processed, and outputted from a loudspeaker.

A transmission system of the terminal will be described below. An analog signal from an input terminal 41, which is produced when an audio signal outputted from a microphone is amplified and otherwise processed, is supplied to a movable contact 42m of a selector switch 42. The selector switch 42 serves to switch between a transmission system of the digital cellular radio communication system and a transmission system of the cordless telephone system.

The selector switch 42 has a first fixed contact 42a connected to the transmission system of the digital cellular radio communication system. Specifically, the audio signal supplied to the first fixed contact 42a of the selector switch 42 is supplied to a QCELP encoder 43 which modulates the audio signal according to QCELP. The modulated audio data are then supplied to a 64-array modulating circuit 44 which spreads and modulates the audio data according to CDMA, thereby producing modulated I and Q components. The I and Q components are supplied respectively to digital-to-analog converters 45I, 45Q which convert the supplied I and Q components into analog data. The analog data are then supplied to first fixed contacts 46a, 47a of respective selector switches 46, 47.

The selector switch 42 has a second fixed contact 42b connected to the transmission system of the cordless telephone system. Specifically, the audio signal supplied to the second fixed contact 42b of the selector switch 42 is supplied to an ADPCM encoder 63 which converts the audio signal into digital data according to ADPCM. The digital data outputted from the ADPCM encoder 63 is supplied to a DQPSK modulating circuit which modulates the digital data according to DQPSK, thereby producing modulated I and Q components. The I and Q components are supplied respectively to digital-to-analog converters 65I, 65Q which convert the supplied I and Q components into analog data. The analog data is then supplied to second fixed contacts 46b, 47b of the respective selector switches 46, 47. The baseband circuit 60 for the cordless telephone system includes the DQPSK demodulating circuit 61, the ADPCM decoder 62, the ADPCM encoder 63, the DQPSK modulating circuit 64, the digital-to-analog converters 65I, 65Q, and the selector switches 46, 47.

The selector switches 46, 47 have respective movable switches 46m, 47m for supplying the I and Q components from their fixed contacts to a quadrature modulating circuit 48 which quadrature-modulates the I and Q components such that they are 90° out of phase with each other. A quadrature-modulated signal outputted from the quadrature modulating circuit 48 is supplied to an up converter 49 which converts the frequency of the quadrature-modulated signal into a predetermined transmission frequency. The frequency converted signal is then amplified by a transmission amplifier 50, and the amplified signal is supplied through the antenna sharing unit 12 to the antenna 11, from which the signal is transmitted over a radio communication channel.

The amplification factor with which the signal is amplified by the transmission amplifier 50 is variable depending on the transmission system. If the radio communication device shown in FIGS. 1A and 1B is to be used as a terminal of the digital cellular radio communication system, then the amplification factor is set to a relatively large value for increased transmission output power. If the radio communication device shown in FIGS. 1A and 1B is to be used as a handset unit of the cordless telephone system, then the amplification factor is set to a relatively small value for reduced transmission output power. The frequency into which the frequency of the signal from the quadrature modulating circuit 48 is converted by the up converter 49 will be described later on.

All the selector switches 15, 22, 42, 46, 47 serve to switch between the digital cellular radio communication system and the cordless telephone system. When the radio communication device shown in FIGS. 1A and 1B is to be used as a terminal or portable telephone set of the digital cellular radio communication system, the movable contacts 15m, 22m, 42m, 46m, 47m of the respective selector switches 15, 22, 42, 46, 47 are connected to the respective first fixed contacts 15a, 22a, 42a, 46a, 47a. When the radio communication device shown in FIGS. 1A and 1B is to be used as a handset unit of the cordless telephone system, the movable contacts 15m, 22m, 42m, 46m, 47m of the respective selector switches 15, 22, 42, 46, 47 are connected to the respective second fixed contacts 15b, 22b, 42b, 46b, 47b.

The portion of the terminal shown in FIGS. 1A and 1B which is exclusive of the intermediate frequency circuit 30 and the baseband circuit 60 for the cordless telephone system is identical to a terminal of a digital cellular radio telephone system according to CDMA.

Figure 2:
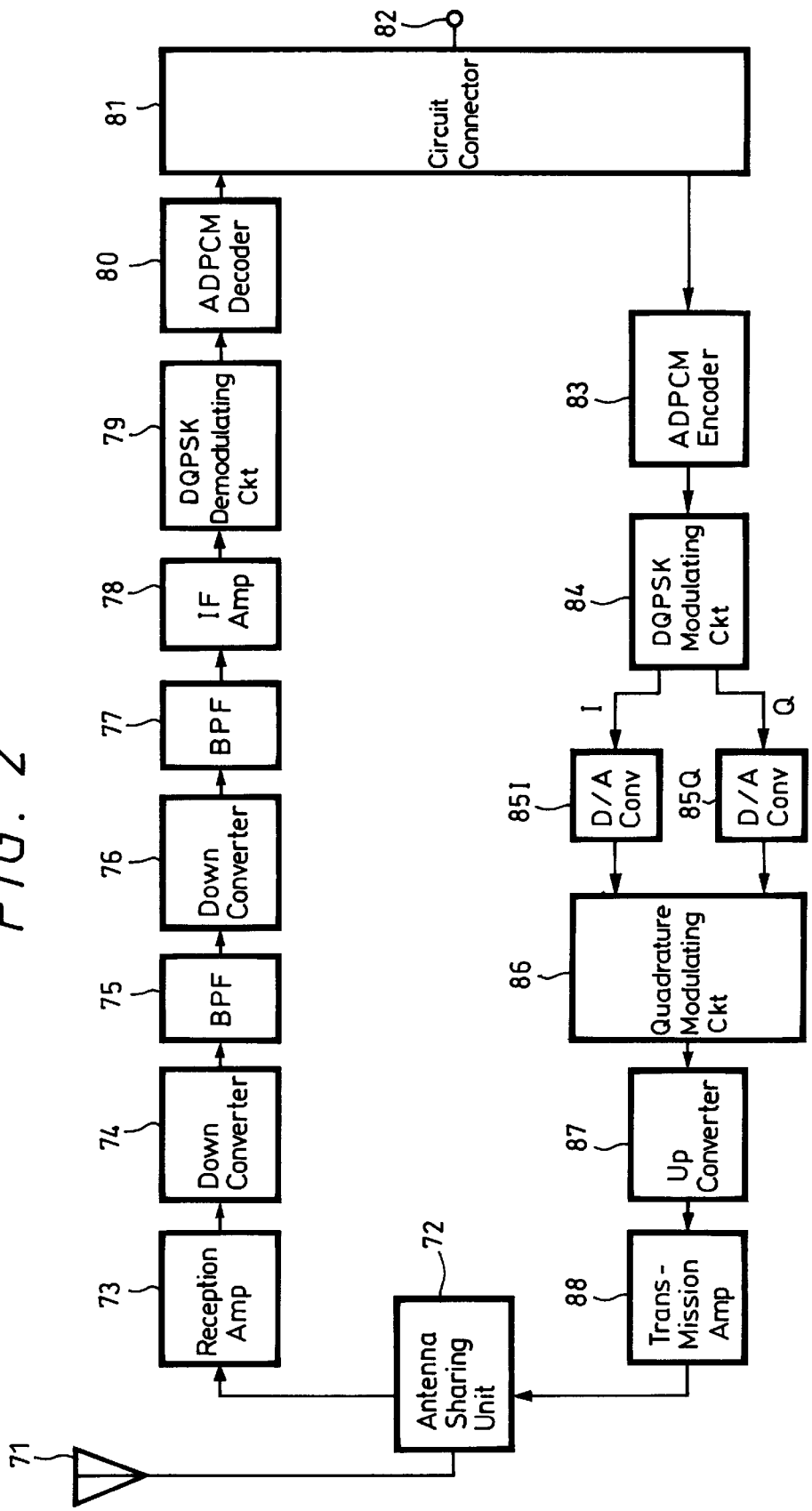
FIG. 2 is a block diagram of a home base station for use with the radio communication device according to the present invention.

A home base station of the cordless telephone system which communicates with the terminal shown in FIGS. 1A and 1B will be described below with reference to FIG. 2. First, a transmission system of the home base station will be described below. As shown in FIG. 2, a signal received by an antenna 71 is supplied through an antenna sharing unit 72 to a reception amplifier 73 called a low-noise amplifier. The received signal which is amplified by the reception amplifier 73 is supplied to a down converter 74 which converts the signal in a given transmission channel into a first intermediate frequency signal. The first intermediate frequency signal is then supplied through a bandpass filter 75 to a down converter 76 which converts the first intermediate frequency signal into a second intermediate frequency signal. The second intermediate frequency signal is supplied through a bandpass filter 77 and an intermediate frequency amplifier 78 to a DQPSK demodulating circuit 79 which demodulates the data modulated according to DQPSK. The demodulated data is supplied to an ADPCM decoder 80 which converts the audio data digitized according to ADPCM into an analog audio signal. The analog audio signal is supplied to a circuit connector 81. The circuit connector 81 processes the supplied analog audio signal as a telephone signal, and transmits the signal from a terminal 82 which is connected to a wired telephone circuit.

A reception system of the home base station will be described below. An audio signal supplied from the wired telephone circuit through the terminal 82 is processed as a telephone signal by the circuit connector 81, and supplied to an ADPCM encoder 83 which converts the audio signal into digital data according to ADPCM. The digital data output from the ADPCM encoder 83 is supplied to a DQPSK modulating circuit 84 which modulates the data according to DQPSK, thus producing I and Q components. The I and Q components is supplied respectively to digital-to-analog converters 85I, 85Q which convert the supplied I and Q components into analog data. The analog data is then supplied to a quadrature modulating circuit 86 which quadrature-modulates the I and Q components such that they are 90° out of phase with each other. A quadrature-modulated signal outputted from the quadrature modulating circuit 86 is supplied to an up converter 87 which converts the frequency of the quadrature-modulated signal into a predetermined transmission frequency. The frequency-converted signal is then amplified by a transmission amplifier 88, and the amplified signal is supplied through the antenna sharing unit 72 to the antenna 71, from which the signal is transmitted over a radio communication channel.

Figure 3:
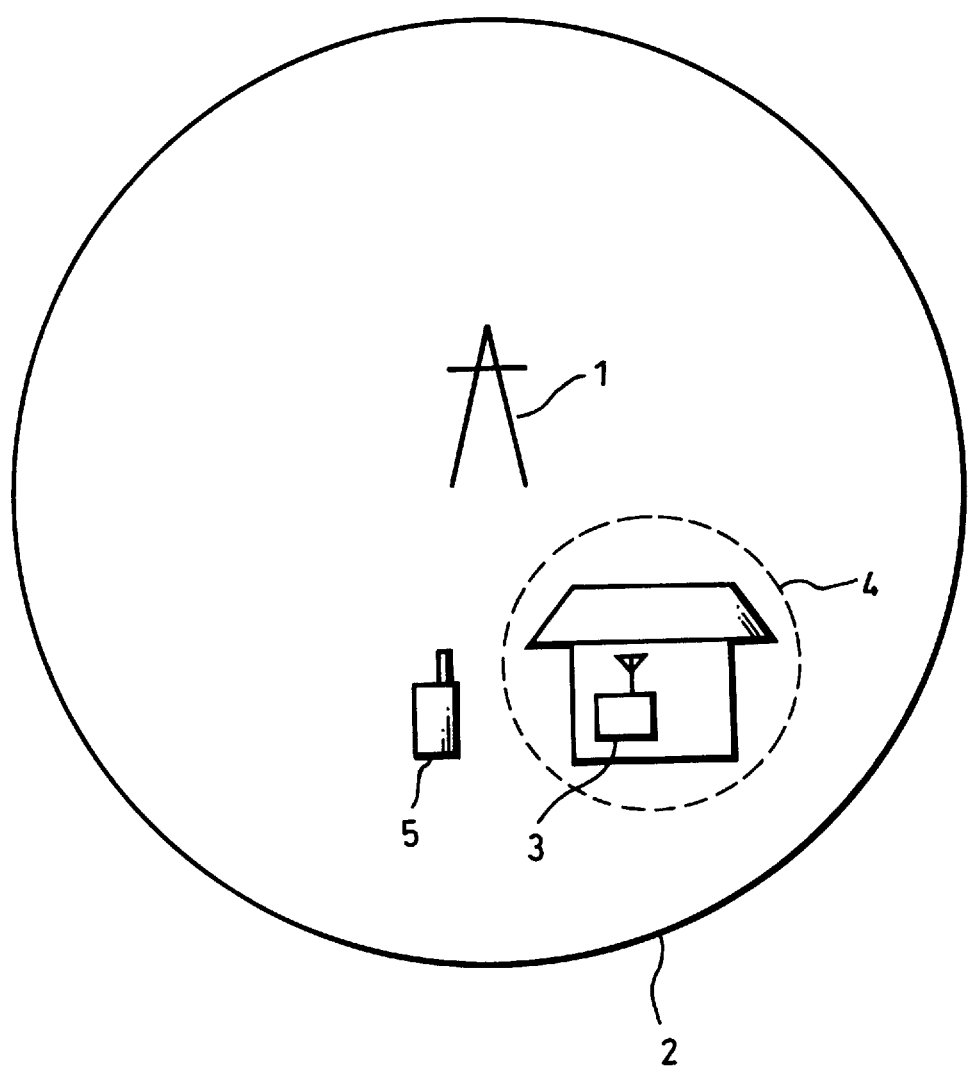
FIG. 3 is a diagram showing an area of a communication system according to the present invention.

A system which comprises the terminal shown in FIGS. 1A and 1B and the home base station of the cordless telephone system shown in FIG. 2 will be described below with reference to FIG. 3. As shown in FIG. 3, a cellular system base station 1 is positioned at the center of a circular service area 2 having a radius of several kilometers. In the digital cellular radio communication system, since the service area 2 is relatively large, the transmission output power of the base station 1 and a terminal 5 (identical to the terminal shown in FIGS. 1A and 1B) is set to a relatively large value. If a home base station 3 (identical to the home base station shown in FIG. 2) of the cordless telephone system is installed at home and connected to a wired telephone circuit, then the home base station 3 covers a circular communication area 4 having a radius of 100 m in which it can communicates with a handset unit (identical to the terminal shown in FIGS. 1A and 1B). In the cordless telephone system, since the circular communication area 4 is relatively small, the transmission output power of the home base station 3 and the handset unit is set to a relatively small value.

When the terminal 5 is positioned in the circular communication area 4 covered by the home base station 3, the movable contacts 15m, 22m, 42m, 46m, 47m of the respective selector switches 15, 22, 42, 46, 47 are connected to the respective second fixed contacts 15b, 22b, 42b, 46b, 47b for carrying out FDMA communications between the home base station 3 and the terminal 5 (operating as a handset unit). The selector switches may be switched to connect the movable contacts 15m, 22m, 42m, 46m, 47m to the respective second fixed contacts 15b, 22b, 42b, 46b, 47b in response to manual mode switching operation or automatically by a control circuit in the terminal 5 in response to a control signal received from the home base station 3.

When the terminal 5 is positioned outside the circular communication area 4 covered by the home base station 3, the movable contacts 15m, 22m, 42m, 46m, 47m of the respective selector switches 15, 22, 42, 46, 47 are connected to the respective first fixed contacts 15a, 22a, 42a, 46a, 47a for carrying out CDMA communications between the cellular system base station 1 and the terminal 5.

Figure 4:
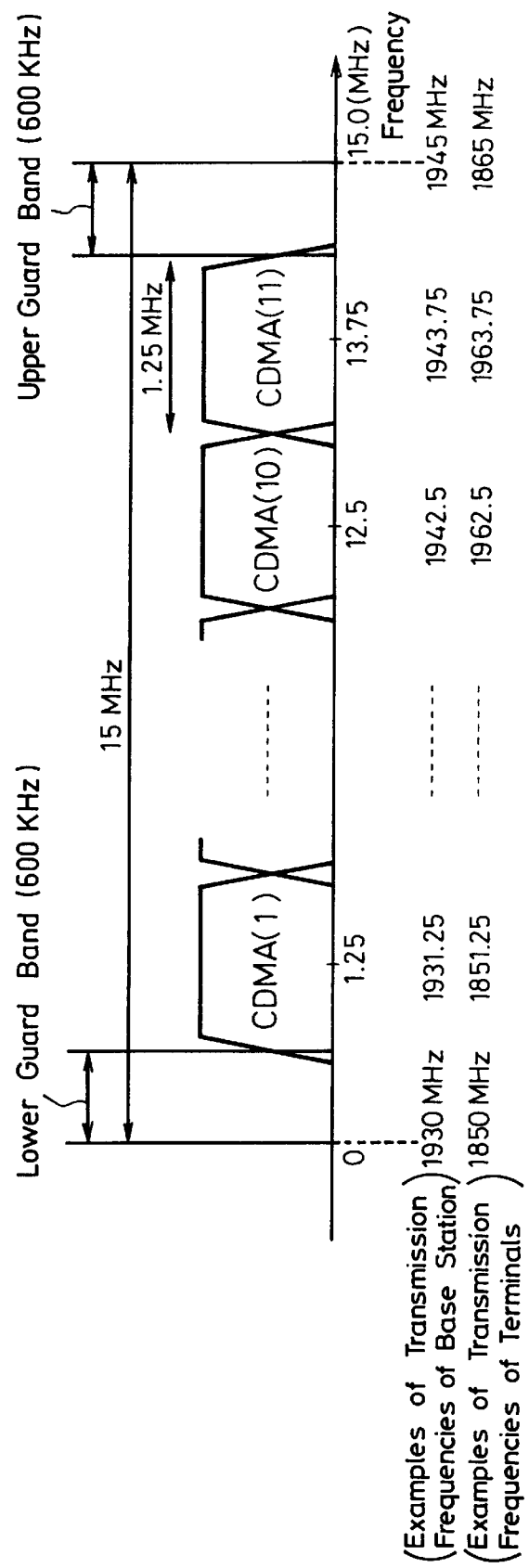
FIG. 4 is a diagram showing channels according to a CDMA system.

Frequencies allocated for communications between the radio communication device used as a terminal of a CDMA cellular system and a base station thereof are shown in FIG. 4. In the CDMA cellular system, a frequency band of 15 MHz is used as a unit, and 11 CDMA channels are present in the frequency band of 15 MHz. Each of the 11 CDMA channels has a bandwidth of 1.23 MHz, and a plurality of transmission signals that are spread using a spreading PN code are multiplexed in each of the CDMA channels.

The CDMA channels are arranged in the frequency band of 15 MHz as follows: If the lowest frequency of the frequency band of 15 MHz, i.e., a lower band edge, is 0 MHz, then the center of the CDMA channel "1" is positioned at 1.25 MHz, with a lower guard band of 600 kHz existing between a lower edge of the band of the CDMA channel "1" and the lower band edge. The other CDMA channels "2", "3", . . . are successively positioned at frequency intervals of 1.25 MHz. The highest CDMA channel "11" has its center positioned at 13.75 MHz, with an upper guard band of 600 kHz existing between an upper edge of the band of the CDMA channel "11" and an upper band edge at 15 MHz. The lower and upper guard bands each of 600 kHz serve to prevent transmission signals in the frequency band of 15 MHz from adversely affecting adjacent frequency bands. Since undesirable radiations are present in these lower and upper guard bands, each of the lower and upper guard bands is required to have a frequency band which is about half the bandwidth (1.23 MHz) of one channel. Different frequency bands each of 15 MHz are employed for the transmission of data from the base station and the transmission of data from the terminal. For example, a frequency band from 1930 MHz to 1945 MHz is employed for the transmission of data from the base station, and a frequency band from 1850 MHz to 1865 MHz is employed for the transmission of data from the terminal. The above frequency allocation for the CDMA cellular system is known in the art.

According to the present invention, communications for the cordless telephone system are carried out using the lower and upper guard bands each of 600 kHz in the frequency band of 15 MHz. Specifically, as shown in FIG. 5A, a cordless band "a" is placed as a frequency band of 300 kHz substantially at the center of the upper guard band of 600 kHz, and a cordless band "b" is placed as a frequency band of 300 kHz substantially at the center of the lower guard band of 600 kHz.

Figures 5A, 5B:
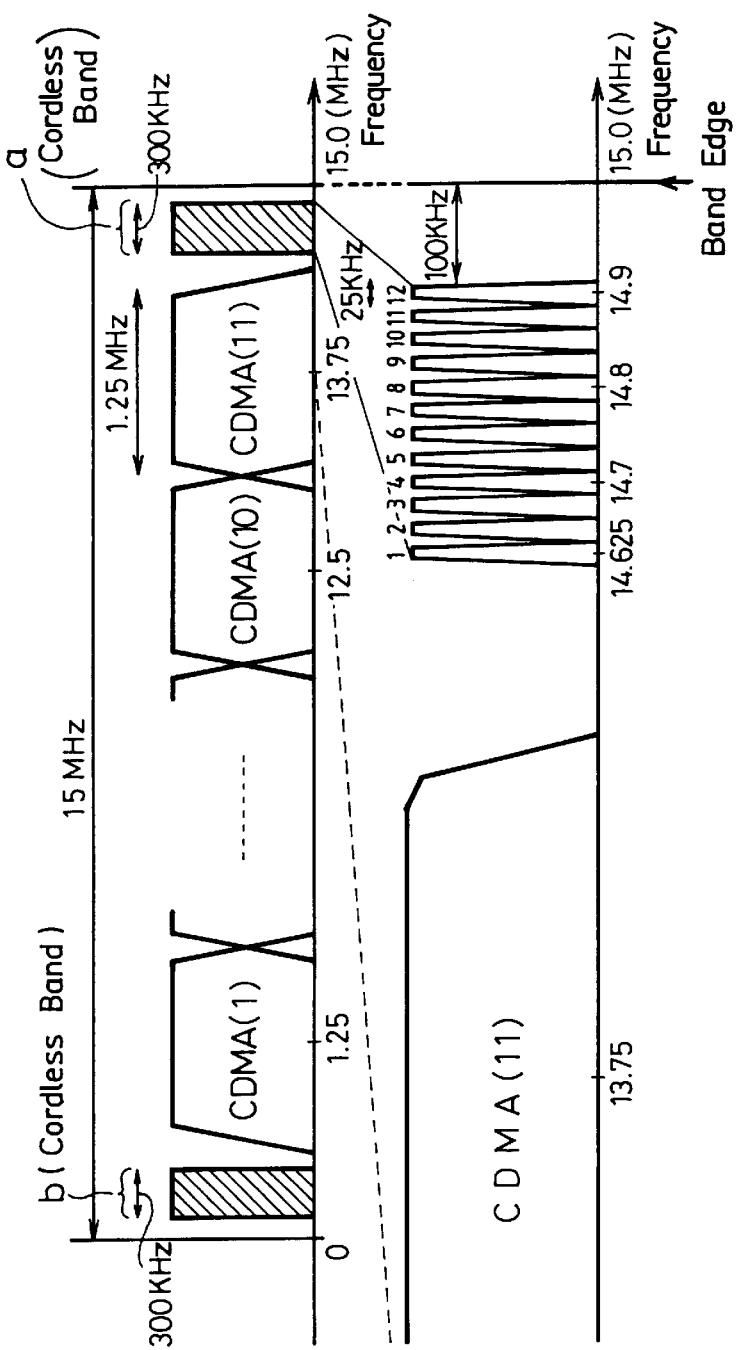
FIGS. 5A and 5B are diagrams showing channels according to the present invention.

As shown at an enlarged scale in FIG. 5B, the cordless band "a" is frequency-divided into 12 channels that are spaced at intervals of 25 kHz within the frequency band of 300 kHz. A channel "1" is positioned at 14.625 MHz and a channel "12" is positioned at 14.9 MHz, with the other channels being present between the channels "1", "12" at intervals of 25 kHz. A guard band of about 100 kHz is present between the upper edge of the band of the channel "12" and the upper band edge of the frequency band of 15 MHz. Similarly, the cordless band "b" is frequency-divided into 12 channels that are spaced at intervals of 25 kHz within the frequency band of 300 kHz, and a guard band of about 100 kHz is present between the lower edge of the band of the channel "1" and the lower band edge of the frequency band of 15 MHz.

Therefore, the frequency band of 15 MHz contains 11 CDMA channels (actually a plurality of spread signals are multiplexed in each of the 11 CDMA channels), and 24 cordless channels.

Inasmuch as the channels for the cordless telephone system are positioned in the guard bands in the frequency band of 15 MHz available for communications according to the CDMA cellular system, desired data can be transmitted highly efficiently. Specifically, the radio communication device for use as both a CDMA cellular terminal and a cordless telephone handset unit uses a common frequency band for data transmission and reception. Therefore, a frequency band in which to receive data with the down converter 14 of the reception system and a frequency band in which to transmit data with the up converter 49 of the transmission system resides in the same frequency band. This is effective in simplifying the arrangement of the radio communication device.

The cordless telephone system employs the FDMA system for reducing the bandwidth of each channel. Therefore, it is possible to allocate many cordless telephone channels in a guard band of the CDMA frequency band. Consequently, cordless telephone channels can be established without reducing the number of CDMA channels of the cellular system at all.

While the guard bands are basically added to avoid interference with other frequency bands, the cordless telephone channels provided in the guard bands are of smaller output power than the CDMA channels of the cellular system, and hence suffer almost no possibility of interfering with CDMA channels in the same frequency band and adjacent frequency bands. Therefore, good transmission characteristics are achieved for both the cellular system and the cordless telephone system.

When the radio communication device is used as a cordless telephone handset unit, signals in the CDMA channels tend to act as interference signals. However, because the cordless telephone handset unit is positioned near the home base station, a higher field intensity is present in the cordless telephone channels than the field intensity in the CDMA channels, resulting in a good signal-to-noise ratio.

In the above embodiment, the CDMA process is employed as an access process for the cellular radio telephone system and the FDMA process is employed as an access process for the cordless telephone system. However, other access processes may be combined with each other. For example, a TDMA (Time Division Multiplex Access) process for dividing the channel of a frequency band into a plurality of time slots and multiplexing them may be employed as an access process for the cellular radio telephone system and the FDMA process may be employed as an access process for the cordless telephone system. Alternatively, the CDMA process may be employed as an access process for the cellular radio telephone system and the TDMA process may be employed as an access process for the cordless telephone system.

The radio communication device according to the present invention may employ any of various other systems having the following channel intervals for first and second occupied frequency bands:

System of 12.5 kHz: analog cordless telephone (narrow bandwidth FM), NTT large-capacity system;

System of 25 kHz: TACS, PDC of Japan;

System of 30 kHz: AMPS (Advanced Mobile Phone System), IS-54 (US TDMA);

System of 100 kHz: CT-2;

System of 200 kHz: GSM;

System of 300 kHz: Japan PHS;

System of 1.23 MHz: CDMA (Qualcomm);

System of 1.25 MHz: CDMA (US PCS - Qualcomm); and

System of 1.782 MHz: DECT (Digital Cordless Telecommunications).

Combinations of the above systems in which the first occupied frequency band is wider than the second occupied frequency band may be used as other examples of the present invention. Other combinations of systems than the above combinations are also possible as examples of the present invention.

While the DQPSK process is used as the modulating process in the illustrated embodiment, other modulating processes may also be employed. Examples of such other modulating processes include:

BPSK (Binary Phase Shift Keying);

QPSK (Quadrature Phase Shift Keying);

GMSK (Gaussian Filtered Shift Keying);

FSK (Frequency Shift Keying);

MSK (Minimum Shift Keying);

16 QAM (Quadrature Amplitude Modulation);

64 QAM (Quadrature Amplitude Modulation);

256 QAM (Quadrature Amplitude Modulation); and

OFDM (Orthogonal Frequency Division Multiplex).

It is possible to use all combinations of the above modulating processes as modulating processes for use in the respective first and second occupied frequency bands.

In the illustrated embodiment, the radio communication device is used as both a terminal of a digital cellular radio communication system and a handset set of a cordless telephone system. However, the radio communication device may be used as both terminals of other two communication systems. For example, the radio communication device is used as both a terminal of a digital cellular radio communication system and a terminal of some other data transmission system.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A radio communication device, comprising:

a first transmission and reception circuit for transmitting and receiving using a first channel established in a first occupied frequency band according to a first access process;

a second transmission and reception circuit for transmitting and receiving using a second channel established in a second occupied frequency band that is established in a guard band of said first occupied frequency band according to a second access process; and a transmission amplifier having an amplification factor for amplifying a signal to be transmitted, wherein said amplification factor is set to a first value when the radio communication device is used according to said first access process, and said amplification factor is set to a second value smaller than said first value if the radio communication device is used according to said second access process.

2. The radio communication device according to claim 1, wherein said first transmission and reception circuit includes means for transmitting and receiving a first signal within said first occupied frequency band according to a code division multiple access process, and said second transmission and reception circuit includes means for transmitting and receiving a second signal within said second occupied frequency band according to a frequency division multiple access process.

3. The radio communication device according to claim 1, wherein said first transmission and reception circuit includes means for transmitting and receiving a first signal within said first occupied frequency band according to a time division multiple access process, and said second transmission and reception circuit includes means for transmitting and receiving a signal within said second occupied frequency band according to a frequency division multiple access process.

4. The radio communication device according to claim 1, wherein said first transmission and reception circuit includes means for transmitting and receiving a first signal within said first occupied frequency band according to a code division multiple access process, and said second transmission and reception circuit includes means for transmitting and receiving a second signal within said second occupied frequency band according to a time division multiple access process.

5. A radio communication method comprising the steps of:

transmitting and receiving using a first channel established in a first occupied frequency band according to a first access process using a first transmission power; and transmitting and receiving using a second channel established in a second occupied frequency band established in a guard band of said first occupied frequency band according to a second access process using a second transmission power, wherein said second transmission power is lower than said first transmission power.

6. The radio communication method according to claim 5, wherein said first occupied frequency band is wider than said second occupied frequency band.

7. The radio communication method according to claim 5, wherein said first access process is a code division multiplex access process, and said second access process is a frequency division multiplex access process.

8. The radio communication method according to claim 5, wherein said first access process is a time division multiplex access process, and said second access process is a frequency division multiplex access process.

9. The radio communication method according to claim 5, wherein said first access process is a code division multiplex access process, and said second access process is a time division multiplex access process.

10. A radio communication device comprising:

a first transmission and reception circuit for transmitting and receiving using a first channel established in a first occupied frequency band according to a first access process; and a second transmission and reception circuit for transmitting and receiving using a second channel established in a second occupied frequency band that is established in a guard band of said first occupied frequency band according to a second access process, wherein said radio communication device is a handset unit of a cordless telephone system having a home base station using said second access process, and further comprising means for automatically switching from said second access process to said first access process in response to a system switching control signal received from said home base station.

11. The radio communication device according to claim 10, wherein when said handset unit is positioned within a communication area covered by said home base station, said second transmission and reception circuit carries out communications with said home base station, and wherein when the handset unit is positioned outside said communication area, said first transmission and reception circuit carries out communications according to said first access process.

* * * * *